US 8,288,899 B2

(12) United States Patent
Park et al.

(10) Patent No.: US 8,288,899 B2
(45) Date of Patent: Oct. 16, 2012

(54) HORIZONTAL LINEAR VIBRATOR

(75) Inventors: Seok Jun Park, Gyunggi-do (KR); Jun Kun Choi, Gyunggi-do (KR); Hwa Young Oh, Seoul (KR); Jee Sung Lee, Gyunggi-do (KR); Yong Jin Kim, Gyunggi-do (KR); Kyung Ho Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 143 days.

(21) Appl. No.: 12/926,568

(22) Filed: Nov. 24, 2010

(65) Prior Publication Data

US 2011/0316361 A1 Dec. 29, 2011

(30) Foreign Application Priority Data

Jun. 29, 2010 (KR) .................. 10-2010-0062290

(51) Int. Cl.
*H02K 33/00* (2006.01)
(52) U.S. Cl. ................ 310/25; 310/81; 310/71
(58) Field of Classification Search ............ 310/15, 310/17, 20, 21, 25, 36, 12.21, 71, 81
See application file for complete search history.

(56) References Cited

U.S. PATENT DOCUMENTS

| 7,911,098 B2* | 3/2011 | Lee et al. ............ 310/81 |
| 8,188,623 B2* | 5/2012 | Park et al. ............ 310/15 |
| 2006/0066164 A1* | 3/2006 | Kim ............... 310/81 |
| 2010/0327673 A1* | 12/2010 | Jun et al. ............ 310/25 |
| 2011/0006618 A1* | 1/2011 | Lee et al. ............ 310/25 |
| 2011/0012441 A1* | 1/2011 | Oh et al. ............ 310/25 |
| 2011/0018364 A1* | 1/2011 | Kim et al. ............ 310/17 |
| 2011/0018365 A1* | 1/2011 | Kim et al. ............ 310/17 |
| 2011/0101797 A1* | 5/2011 | Lee et al. ............ 310/29 |

FOREIGN PATENT DOCUMENTS

| JP | 2001-212509 | 8/2001 |
| KR | 10-2005-0083528 | 8/2005 |
| KR | 10-0720197 | 5/2007 |
| KR | 10-2010-0004622 | 1/2010 |

OTHER PUBLICATIONS

Korean Office Action issued Aug. 19, 2011 in corresponding Korean Patent Application 10-2010-0062290.

* cited by examiner

*Primary Examiner* — Thanh Lam

(57) ABSTRACT

There is provided a horizontal linear vibrator including a bracket providing an internal space; a vibration unit mounted in the internal space and including a mass body moving horizontally and linearly; and a magnetic field unit including a magnet fixed to the mass body and a coil installed within a magnetic field of the magnet and generating electromagnetic force to allow the vibration unit to move horizontally and linearly, wherein the coil includes a coil line disposed between the bracket and a printed circuit board and extending outside of the internal space of the bracket such that the coil line is connected with the printed circuit board for applying power from an external source to the coil outside of the internal space of the bracket.

10 Claims, 5 Drawing Sheets

HORIZONTAL LINEAR VIBRATOR

CROSS-REFERENCE TO RELATED APPLICATIONS

This application claims the priority of Korean Patent Application No. 10-2010-0062290 filed on Jun. 29, 2010, in the Korean Intellectual Property Office, the disclosure of which is incorporated herein by reference.

BACKGROUND OF THE INVENTION

1. Field of the Invention

The present invention relates to a horizontal linear vibrator and, more particularly, to a horizontal linear vibrator designed to be mounted on a personal mobile terminal to vibrate.

2. Description of the Related Art

In general, one of the key functions requisite for communication devices is a call reception function. Commonly used call reception functions include a sound generating function that generates a melody or a bell sound and a vibration function that transfers vibrations to a device.

Among the functions, the vibration function is commonly used so as not to interfere with others by preventing a melody or a bell sound from being transferred to the exterior through a speaker.

In order to implement such a vibration function, in general, a small vibration motor is driven to transfer driving force to a case of a device to make the device vibrate.

In particular, recently, as mobile terminals have been reduced in size and have improved in quality, the use of a touch screen type display device has been greatly favored, requiring a vibration generation function when a touch is applied to the touch screen, so the improvement of the vibration motor has gradually taken place.

A vibration motor applied to existing mobile phones generates rotatory power in order to rotate a rotational part of an unbalance mass, thus obtaining mechanical vibrations, and in this case, rotatory power is generated such that it is mostly subjected to a rectifying action through a brush and a contact point of a commutator (or rectifier) to provide current to a rotor coil.

However, in the brush type structure using a commutator, when the motor rotates, the brush passes through the gap between segments of the commutator, resulting in mechanical friction and an electrical spark as well as abrading the brush and the commutator and thereby shortening the life span of the motor.

In addition, because voltage is applied to the motor by using a moment of inertia, time is taken to reach a target amount of vibrations, so it is difficult to implement vibrations suitable for touch screen-employed personal mobile terminals and the like.

In order to overcome such disadvantages in terms of life span and responsiveness, a linear vibrator with the exclusion of a rotational principle is being used.

A linear vibrator generates vibrations by electromagnetic force having a resonance frequency determined by using a spring installed therein and a mass body coupled with the spring.

However, such a linear vibrator is designed to vibrate in a vertical direction and is able to generate vibrations only when the linear vibrator moves by securing the upper and lower displacements of the mass body provided therein. This puts limitations on the thickness thereof.

Also, in order to realize a large amount of vibrations, the thickness thereof should be increased. For this reason, it is required to have a larger space for mounting the vibrator on a personal mobile terminal, thereby being unsuitable for miniaturization.

SUMMARY OF THE INVENTION

An aspect of the present invention provides a horizontal linear vibrator vibrating in a horizontal direction, namely, in a lengthwise direction, of a personal mobile terminal, generating large vibration power, and preventing a soldering portion of a coil and a printed circuit board from making contact with a vibration unit.

According to an aspect of the present invention, there is provided a horizontal linear vibrator including: a bracket providing an internal space; a vibration unit mounted in the internal space and including a mass body moving horizontally and linearly; and a magnetic field unit including a magnet fixed to the mass body and a coil installed within a magnetic field of the magnet and generating electromagnetic force to allow the vibration unit to move horizontally and linearly, wherein the coil includes a coil line disposed between the bracket and a printed circuit board and extending outside of the internal space of the bracket such that the coil line is connected with the printed circuit board for applying power from an external source to the coil outside of the internal space of the bracket.

The coil line may be disposed between an upper surface of the bracket and a lower surface of the printed circuit board, and the printed circuit board may include a recess allowing the coil line extending to an upper portion of the printed circuit board to be fixed thereto.

The printed circuit board may include a cut-out portion allowing the coil line extending to an upper portion of the printed circuit board to be inserted thereinto.

The printed circuit board may include a plurality of printed circuit boards, and the coil line may be inserted between the printed circuit boards to extend to upper portions of the printed circuit boards.

The printed circuit board may include an extension part extending outside of the internal space of the bracket, and the coil line may be subjected to soldering on the extension part.

The magnet may have a rectangular shape in order to increase electromagnetic force.

The coil may have a shape corresponding to that of the magnet.

The bracket may have at least one or more protrusions on an inner surface thereof, and the printed circuit board may be fixed by the at least one or more protrusions.

The horizontal linear vibrator may further include a cover unit covering an upper portion of the bracket.

The horizontal linear vibrator may further include a damper disposed between the bracket and the coil and absorbing vibrations of the vibration unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
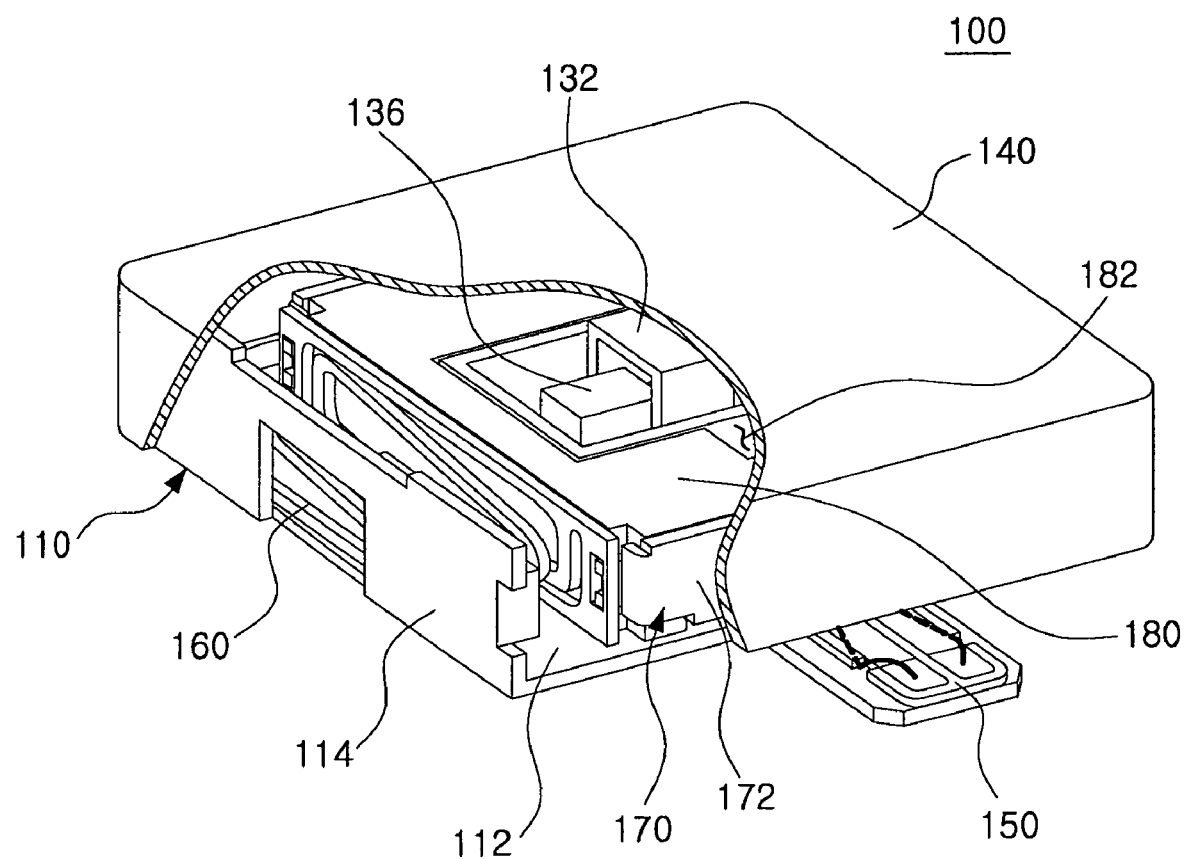
FIG. 1 is a cut-away perspective view schematically illustrating a horizontal linear vibrator according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions may be exaggerated for clarity, and the same reference numerals will be used throughout to designate the same or like components.

Figure 2:
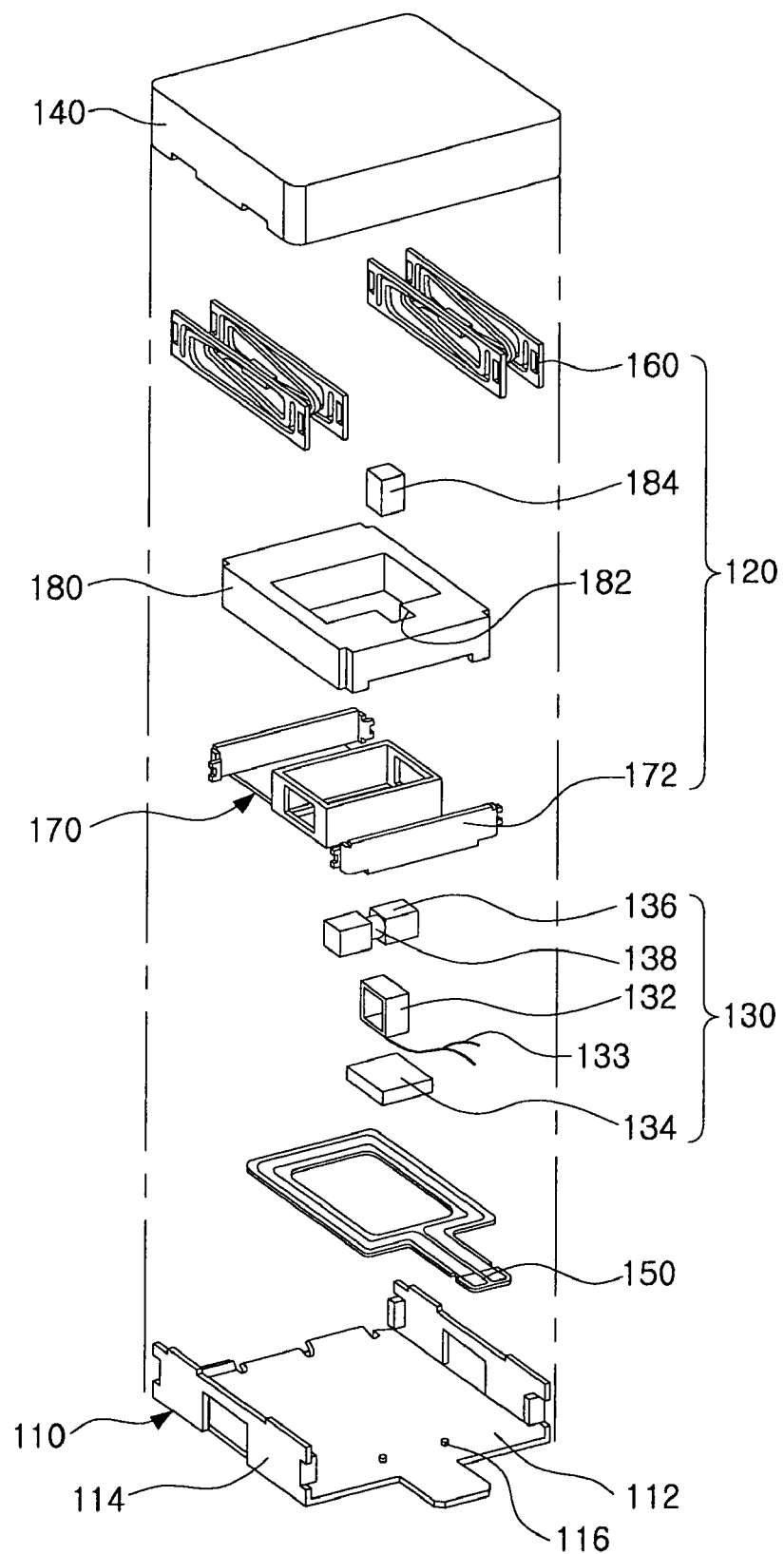
FIG. 2 is an exploded perspective view schematically illustrating a horizontal linear vibrator according to an exemplary embodiment of the present invention.
Figure 3:
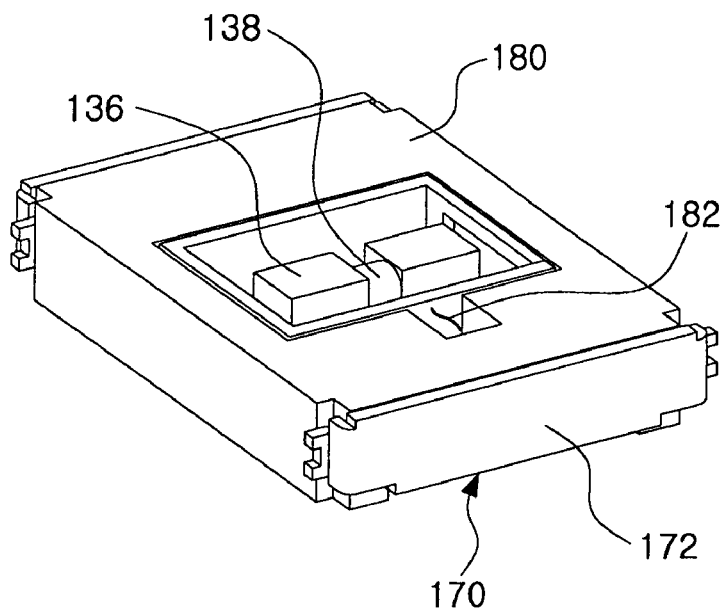
FIG. 3 is a schematic perspective view illustrating a vibration assembly provided in a horizontal linear vibrator according to an exemplary embodiment of the present invention.

FIG. 1 is a cut-away perspective view schematically illustrating a horizontal linear vibrator according to an exemplary embodiment of the present invention. FIG. 2 is an exploded perspective view schematically illustrating a horizontal linear vibrator according to an exemplary embodiment of the present invention. FIG. 3 is a perspective view schematically illustrating a vibration assembly provided in a horizontal linear vibrator according to an exemplary embodiment of the present invention.

With reference to FIGS. 1 through 3, a horizontal linear vibrator 100 according to an exemplary embodiment of the invention may include a bracket 110, a vibration unit 120, a magnetic field unit 130, and a cover unit 140.

The bracket 110 has a structure in which the upper portion and lengthwise directional side portions thereof are open to correspond to the cover unit 140. Namely, the bracket 110 has a bracket lower plate 112 and widthwise directional support plates 114 and is assembled with the cover unit 140 to form an internal space.

A coil 132 having a rectangular shape may be fixed to the upper portion of the bracket lower plate 112, and a printed circuit board 150 may be mounted to be positioned near the coil 132.

At least one or more protrusions 116 may be formed on the upper portion of the bracket lower plate 112 for coupling with the printed circuit board 150. The printed circuit board 150 may be disposed between the protrusions 116 to be inserted and fixed thereto.

Here, the coil 132 is not limited to the rectangular shape, and may be modified to have various forms known in the art to which the invention pertains.

The support plates 114 are formed to be bent to be perpendicular to the bracket lower plate 112 to allow spring members 160 to be inserted and fixed to the inner surfaces of the support plates 114. Accordingly, an outer shape of the bracket 110 may be a U-like shape, but the outer shape of the bracket 110 is not limited thereto.

The support plates 114 are positioned at both side portions of the vibration unit 120 to support the vibration unit 120, allowing the vibration unit 120 to vibrate.

The printed circuit board 150 may be installed on the bracket lower plate 112. The printed circuit board 150 is connected to an external input terminal and transfers power applied thereto to the coil 132. The printed circuit board 150 may have a pattern part formed on the upper surface thereof and an opening part formed therein to allow the coil 132 to pass therethrough.

However, the printed circuit board 150 is not limited to the configuration in which the printed circuit board 150 is formed separately from the bracket 110. Namely, the printed circuit board 150 and the bracket 110 may be integrally formed according to a designer's intention.

Here, the coil 132 may include the rectangular coil 132. The rectangular coil 132 serves to generate a magnetic field of a certain strength when power is applied thereto from an external source. The rectangular coil 132 may be fixed to the upper portion of the bracket lower plate 112.

However, the coil 132 may be disposed on the upper surface of the bracket lower plate 112. A separate plate may be formed to have the coil 132 disposed thereon.

Also, the coil 132 may include a coil line 133 in a manner such that the coil line 133 is connected with the pattern part of the printed circuit board 150 through soldering, whereby power can be applied to the coil 132 from an external source.

The coil line 133 may extend outside of the internal space of the bracket 110, and a detailed description thereof will be provided below.

A damper 134 may be disposed between the lower portion of the coil 132 and the upper portion of the bracket lower plate 112. The damper 134 may serve to prevent the outer surface of the bracket 110 from being shaken when the vibration unit 120 vibrates.

Also, the damper 134 may protect the internal constituents of the horizontal linear vibrator from external impacts, whereby reliability may be achieved.

The vibration unit 120 may include a yoke part 170 accommodating the coil 132 and a magnet 136 therein, and a mass body 180 accommodating the magnet 136 and the yoke part 170 therein. The vibration unit 120 may vibrate in a horizontal direction by an interaction of the magnet 136 and the coil 132.

The mass body 180 serves to apply a certain mass to the vibration unit 120 for linear vibrations, and includes an accommodating space to accommodate the central portion of the yoke part 124 therein.

Thus, the mass body 180 accommodates the central portion of the yoke part 170 accommodating the magnet 136 in its accommodating space. They are assembled such that extension parts 172 bent from the yoke part 170 are in contact with the outer side surfaces of the mass body 180.

The mass body 180 may have a mass of a certain size and vibrate horizontally in a vibration direction according to an interaction of the magnet 136 and the coil 132.

Here, the vibration direction refers to a direction horizontal to the coil 132.

The mass body 180 may include an insertion part 182 formed to be adjacent to the accommodating space in which the yoke part 170 is accommodated.

The insertion part 182 may be formed when the internal accommodating space of the mass body 180 is formed. The insertion parts may be provided at both side portions of the internal accommodating space.

The insertion part 182 may form a space into which a sub-mass body 184 is additionally inserted. The sub-mass body 184 is formed to have a certain unit mass. One or more sub-mass bodies may be inserted into the insertion part 182 according to necessity.

The sub-mass body 184 may be made of tungsten having a high specific gravity or a general material having a certain weight. However, without being limited thereto, the sub-mass body 184 may be made of various other materials according to the designer's intention.

The magnetic field unit 130 may include the coil 132 and the magnet 136 disposed to be adjacent to the coil 132.

A vibration direction of the vibration unit 120 is determined according to the Lorentz Force by an electric force of the frequency generated from the coil 132 and the direction of a magnetic field generated toward the yoke part 170 from the magnet 136.

The magnet 136 serves to force the vibration unit 120 to vibrate linearly according to its interaction with the coil 132 by generating a magnetic field of a certain strength. The magnets 136 are attached to both sides of a magnetic core 138.

Here, the magnets 136 attached to the both sides of the magnetic core 138 may be disposed such that the same polarities face each other.

The yoke part 170 serves to self-close a circuit to smoothly form a magnetic flux of the magnet 136. The yoke part 170 may have an internal space in which the coil 132 and the magnet 136 are accommodated.

Both side surfaces of the yoke part 170 may include the extension parts 172 bent so as to be positioned perpendicular to the bracket lower plate 112 and tightly attached to the outer side surfaces of the mass body 180. Therefore, when the central portion of the yoke part 170 is accommodated in the accommodating space of the mass body 180, the extension parts 172 can be tightly attached to the outer side surfaces of the mass body 180, and thus, the mass body 180 and the extension parts 172 can be stably bound.

The spring members 160 serve to elastically support the vibration unit 120 to move horizontally in a linear direction. In a state in which one side of the spring member 160 is fixed to the widthwise directional support plate 114 of the bracket 110, the other side of the spring member 160 is fixed to the vibration unit 120, thereby elastically supporting the vibration unit 120.

Here, the spring members 160 are provided as pairs in corresponding positions at both sides of the vibration unit 120, and disposed at the upper portion of the bracket 110. The spring member 160 may be, for example, a coil spring, a plate spring, or the like.

The cover unit 140 is formed to cover the upper portion of the bracket 110 and protects the internal constituents against external impacts.

In order to couple the cover unit 140 with the bracket 110, the bracket 110 and the cover unit 140 may have a protrusion part and an accommodating recess in which the protrusion part is accommodated, respectively, or vice versa.

Figure 4:
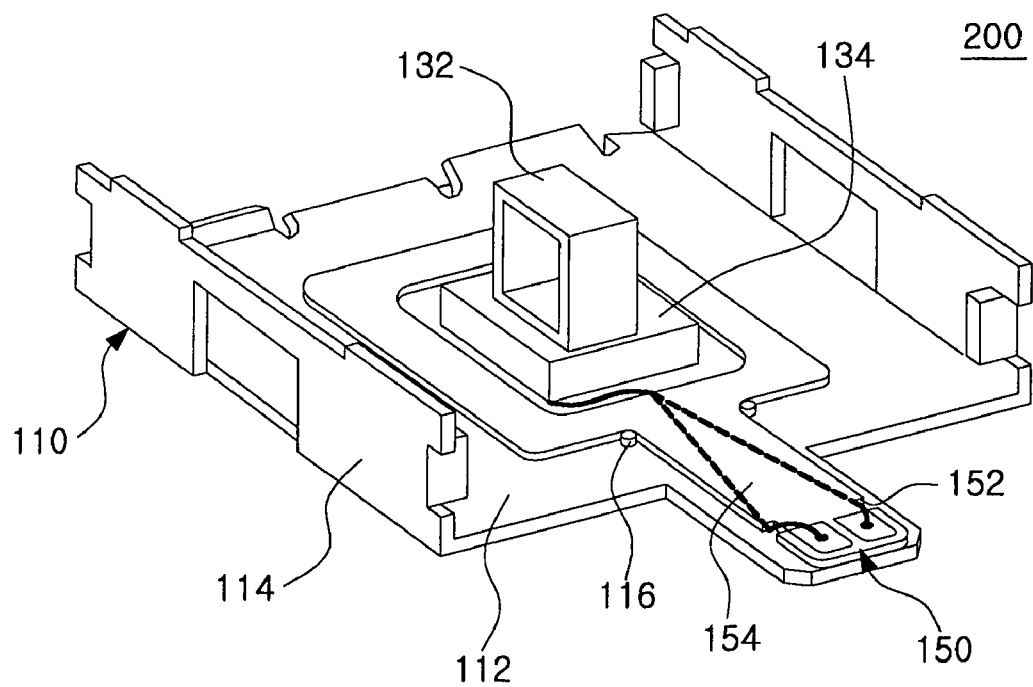
FIG. 4 is a schematic perspective view illustrating a bracket assembly provided in a horizontal linear vibrator according to an exemplary embodiment of the present invention.
Figure 5:
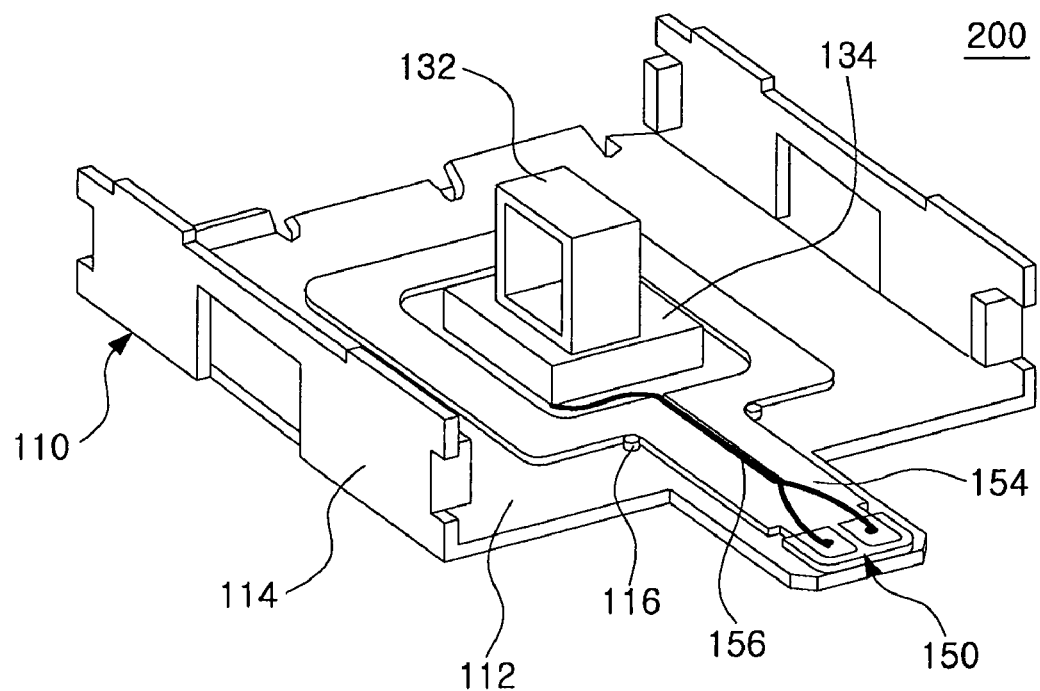
FIG. 5 is a schematic perspective view illustrating a bracket assembly provided in a horizontal linear vibrator according to another exemplary embodiment of the present invention.
Figure 6:
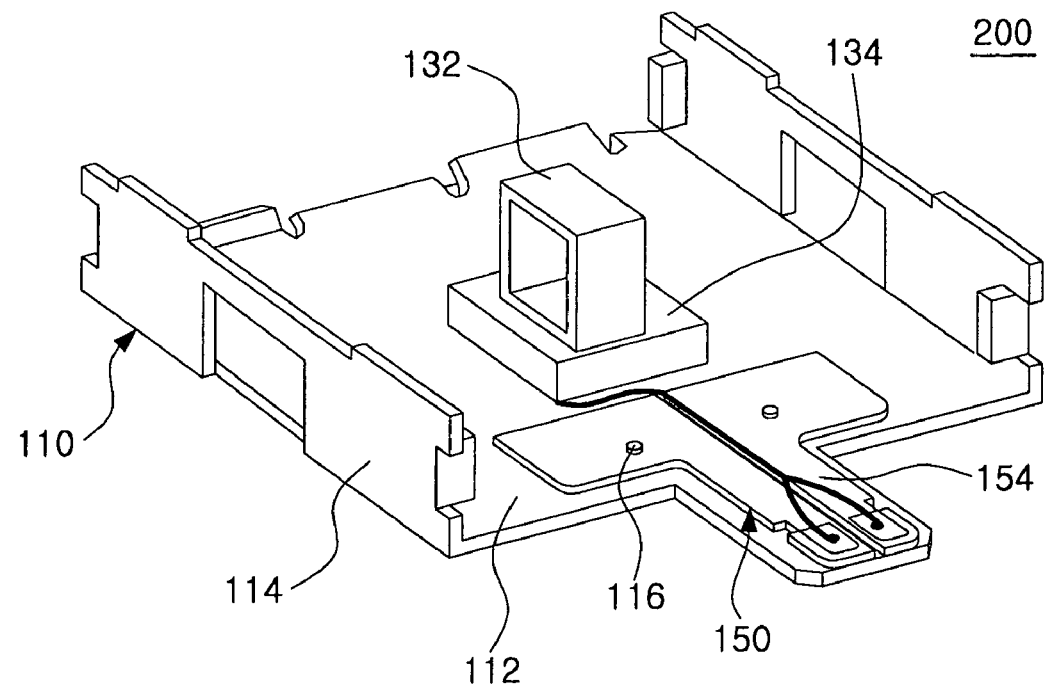
FIG. 6 is a schematic perspective view illustrating a bracket assembly provided in a horizontal linear vibrator according to another exemplary embodiment of the present invention.

FIG. 4 is a schematic perspective view illustrating a bracket assembly provided in a horizontal linear vibrator according to an exemplary embodiment of the present invention. FIG. 5 is a schematic perspective view illustrating a bracket assembly provided in a horizontal linear vibrator according to another exemplary embodiment of the present invention. FIG. 6 is a schematic perspective view illustrating a bracket assembly provided in a horizontal linear vibrator according to another exemplary embodiment of the present invention.

With reference to FIG. 4, a bracket assembly 200 provided in the horizontal linear vibrator 100 according to an exemplary embodiment of the invention may include the bracket 110, the printed circuit board 150, the coil 132 and the coil line 133.

The bracket 110 and the printed circuit board 150 of the present embodiment are substantially the same as those of the aforementioned embodiment, so a detailed description thereof will be omitted.

The coil 132 is disposed on the upper portion of the bracket lower plate 112. Also, the coil 132 may include the coil line 133 such that the coil line 133 is connected with the pattern part of the printed circuit board 150 through soldering, whereby power can be applied to the coil 132 from an external source.

The coil line 133 may be disposed between the bracket lower plate 112 and the printed circuit board 150 and formed to extend outside of the internal space of the bracket 110.

The printed circuit board 150 may include an extension part 154 extending outside of the internal space of the bracket 110. The coil line 133 may extend to the extension part 154.

The printed circuit board 150 may have recesses 152 in the side surfaces of the extension part 154 to allow the coil line 133 to pass therethrough. The coil line 133 disposed at the lower portion of the printed circuit board 150 may pass through the recesses 152 to extend to the upper portion of the printed circuit board 150.

That is, the coil line 133 is disposed between the upper surface of the bracket lower plate 112 and the lower surface of the printed circuit board 150 and extends to the upper portion of the printed circuit board 150 through the recesses 152 of the printed circuit board 150. The recesses 152 allow the coil line 133 extending to the upper portion of the printed circuit board 150 to be fixed.

Also, the coil line 133 extending to the upper portion of the printed circuit board 150 is connected with the pattern part of the printed circuit board 150 through soldering on the extension part 154, whereby power can be applied thereto from an external source.

Also, the at least one or more protrusions 116 are provided on the upper portion of the bracket lower plate 112 for coupling with the printed circuit board 150, and the printed circuit board 150 may be disposed between the protrusions 116 to be inserted and fixed thereto.

With reference to FIG. 5, the bracket assembly 200 provided in the horizontal linear vibrator 100 according to another exemplary embodiment of the invention may include the printed circuit board 150 having a cut-out portion 156.

The printed circuit board 150 may have the cut-out portion 156 formed on a surface thereof. The cut-out portion 156 may allow the coil line 133 extending outside of the internal space of the bracket 110 to be inserted therein.

The coil line 133 is inserted and fixed to the cut-out portion 156. The coil line 133 is extended to the outside at an edge of the cut-out portion 156 to be connected with the pattern part of the printed circuit board 150 through soldering on the extension part 154 of the printed circuit board 150, whereby power can be applied thereto from an external source.

With reference to FIG. 6, the bracket assembly 200 provided in the horizontal linear vibrator 100 according to another exemplary embodiment of the invention may include the printed circuit board 150 comprising a plurality of printed circuit boards.

The plurality of printed circuit boards 150 may allow the coil line 133 extending outside of the internal space of the bracket 110 to be inserted therebetween. That is, the coil line 133 may be inserted between the printed circuit boards 150.

The coil line 133 is inserted and fixed between the printed circuit boards 150. The coil line 133 is extended to the outside between the extension parts 154 of the printed circuit boards 150. The coil line 133 is connected with the pattern parts of the printed circuit boards 150 through soldering on the extension parts 154 of the printed circuit boards 150, whereby power can be applied thereto from an external source.

Also, the at least one or more protrusions 116 may be formed on the upper portion of the bracket lower plate 112 for coupling with the printed circuit boards 150. The protrusions 116 may be inserted into and fixed to holes provided in the printed circuit boards 150.

In the bracket assembly 200, the coil line 133 extends outside of the internal space of the bracket 110 and the soldering with the printed circuit board 150 is performed outside of the internal space of the bracket 110, i.e., the extension part 154 of the printed circuit board 150, whereby space efficiency with respect to the internal constituents of the bracket 110 may be maximized.

Also, since the vibration unit 120 is prevented from making contact with the soldering portion of the coil 132 and the printed circuit board 150, foreign object defect caused by the contact may be avoided.

Also, the damage to the coil 132 that may be caused during soldering may be prevented.

Figure 7:
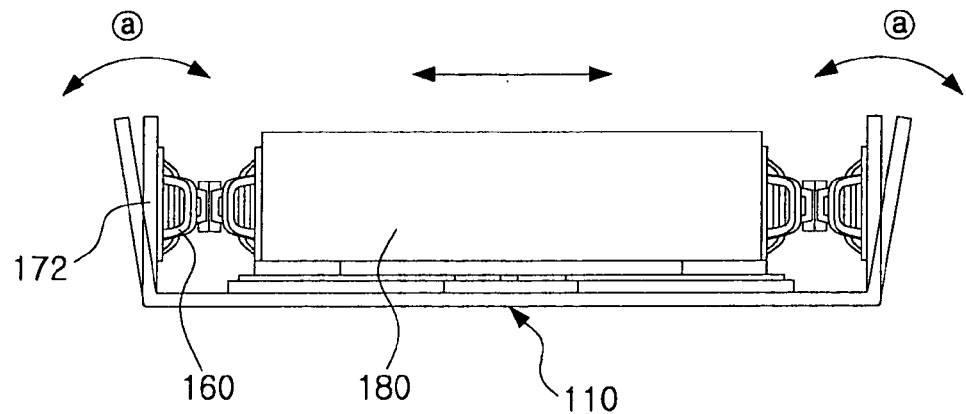
FIG. 7 is a schematic perspective view illustrating the vibrations of a bracket when a horizontal linear vibrator vibrates according to an exemplary embodiment of the present invention.
Figure 8:
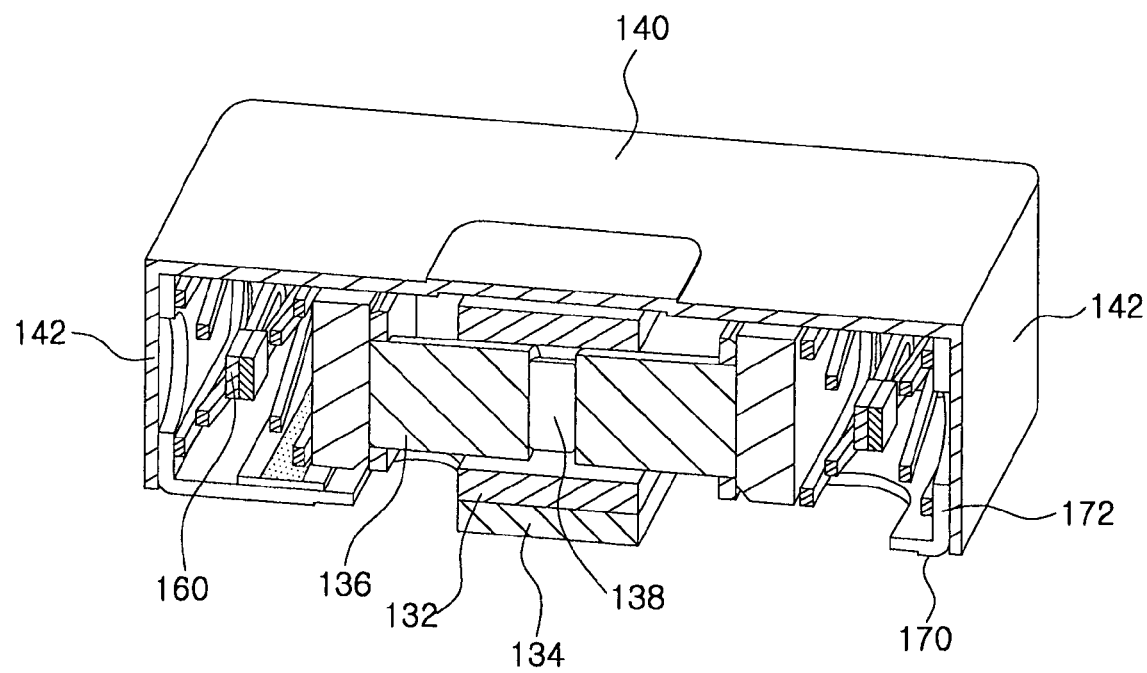
FIG. 8 is a schematic perspective view illustrating the effects of a cover unit and a damper in a horizontal linear vibrator according to an exemplary embodiment of the present invention.

FIG. 7 is a schematic perspective view illustrating the vibrations of a bracket when a horizontal linear vibrator vibrates according to an exemplary embodiment of the present invention. FIG. 8 is a schematic perspective view illustrating the effects of a cover unit and a damper in a horizontal linear vibrator according to an exemplary embodiment of the present invention.

As shown in FIG. 7, the mass body 180 is disposed to accommodate the yoke part 170 therein and the spring members 160 are inserted to both side portions of the mass body 180.

When the vibration unit 120 vibrates by the interaction of the magnet 136 and the coil 132, the support plate 114 of the bracket 110 is naturally shaken (see (a)). Such a shaking of the bracket 110 may cause a reduction in the vibration power of the vibration unit 120.

With reference to FIG. 8, after the mass body 180 is disposed to accommodate the yoke part 170 therein and the spring members 160 are inserted to the both side portions of the mass body 180, the cover unit 140 is assembled to cover the bracket 110.

Therefore, since a sidewall 142 of the cover unit 140 contacts the outer side surface of the support plate 114 of the bracket 110, it prevents the support plate 114 of the bracket 110 from being shaken while the mass body 180 vibrates as shown in FIG. 7, and thus the vibration power of the vibration unit 120 can be improved.

Also, in the case in which the spring member 160 moves together with the support plate 114 of the bracket 110 by the shaking of the support plate 114, the movement thereof becomes larger, and the life span thereof may accordingly be reduced. In the present embodiment, however, the outer side surface of the bracket 110 is prevented from being shaken, whereby the life span of the spring member 160 may be further extended.

Here, the damper 134 as well as the sidewall 142 of the cover unit 140 may prevent the shaking of the support plate 114.

As set forth above, since a horizontal linear vibrator according to exemplary embodiments of the invention vibrates in a horizontal direction rather than a thickness direction of a personal mobile terminal, it is possible to achieve a reduction in the thickness of the personal mobile terminal and an increase in the movement displacement of a vibration unit in the lengthwise direction of the personal mobile terminal, whereby a vibration function can be improved.

Also, since a soldering portion of a coil and a printed circuit board is positioned outside of a bracket, the soldering portion is prevented from making contact with a vibration unit when the vibration unit vibrates.

While the present invention has been shown and described in connection with the exemplary embodiments, it will be apparent to those skilled in the art that modifications and variations can be made without departing from the spirit and scope of the invention as defined by the appended claims.

What is claimed is:

1. A horizontal linear vibrator comprising:
   a bracket providing an internal space;
   a vibration unit mounted in the internal space and including a mass body moving horizontally and linearly; and
   a magnetic field unit including a magnet fixed to the mass body and a coil installed within a magnetic field of the magnet and generating electromagnetic force to allow the vibration unit to move horizontally and linearly,
   wherein the coil includes a coil line disposed between the bracket and a printed circuit board and extending outside of the internal space of the bracket such that the coil line is connected with the printed circuit board for applying power from an external source to the coil outside of the internal space of the bracket.

2. The horizontal linear vibrator of claim 1, wherein the coil line is disposed between an upper surface of the bracket and a lower surface of the printed circuit board, and
   the printed circuit board includes a recess allowing the coil line extending to an upper portion of the printed circuit board to be fixed thereto.

3. The horizontal linear vibrator of claim 1, wherein the printed circuit board includes a cut-out portion allowing the coil line extending to an upper portion of the printed circuit board to be inserted thereinto.

4. The horizontal linear vibrator of claim 1, wherein the printed circuit board comprises a plurality of printed circuit boards, and
   the coil line is inserted between the printed circuit boards to extend to upper portions of the printed circuit boards.

5. The horizontal linear vibrator of claim 1, wherein the printed circuit board comprises an extension part extending outside of the internal space of the bracket, and
   the coil line is subjected to soldering on the extension part.

6. The horizontal linear vibrator of claim 1, wherein the magnet has a rectangular shape in order to increase electromagnetic force.

7. The horizontal linear vibrator of claim 6, wherein the coil has a shape corresponding to that of the magnet.

8. The horizontal linear vibrator of claim 1, wherein the bracket has at least one or more protrusions on an inner surface thereof, and
   the printed circuit board is fixed by the at least one or more protrusions.

9. The horizontal linear vibrator of claim 1, further comprising a cover unit covering an upper portion of the bracket.

10. The horizontal linear vibrator of claim 1, further comprising a damper disposed between the bracket and the coil and absorbing vibrations of the vibration unit.

* * * * *